(12) United States Patent
Potharaju et al.

(10) Patent No.: US 11,665,594 B2
(45) Date of Patent: May 30, 2023

(54) TELEMETRY DATA CORRELATION FOR DEVICE-LEVEL ASSURANCE IN WIRELESS NETWORKS

(71) Applicant: Cisco Technology, Inc., San Jose, CA (US)

(72) Inventors: Shailender Potharaju, Fremont, CA (US); Rajesh S. Pazhyannur, Fremont, CA (US); Anal Srivastava, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 45 days.

(21) Appl. No.: 16/700,467

(22) Filed: Dec. 2, 2019

(65) Prior Publication Data

US 2021/0168657 A1 Jun. 3, 2021

(51) Int. Cl.
*H04W 28/12* (2009.01)
*H04W 56/00* (2009.01)
*H04W 28/02* (2009.01)

(52) U.S. Cl.
CPC ....... *H04W 28/12* (2013.01); *H04W 28/0231* (2013.01); *H04W 28/0273* (2013.01); *H04W 56/001* (2013.01)

(58) Field of Classification Search
CPC ............. H04W 28/12; H04W 28/0273; H04W 28/0231; H04W 56/001; H04W 8/18; H04W 8/30; H04W 8/02; H04W 8/08; H04W 8/087; H04W 8/14; H04W 8/22; H04W 24/10; H04L 43/04; H04L 43/045; H04L 43/065; H04L 43/0823
See application file for complete search history.

(56) References Cited

U.S. PATENT DOCUMENTS

| | | | |
|---|---|---|---|
| 9,648,542 B2 | 5/2017 | Hsu et al. | |
| 9,838,997 B2 | 12/2017 | Smith | |
| 10,462,609 B1 * | 10/2019 | Carroll | H04W 4/029 |
| 2004/0049599 A1 * | 3/2004 | Friend | H04L 67/04 |
| | | | 709/248 |
| 2011/0044283 A1 * | 2/2011 | Rubin | H04W 8/02 |
| | | | 370/329 |
| 2011/0188397 A1 * | 8/2011 | McCann | H04L 43/00 |
| | | | 370/252 |

(Continued)

OTHER PUBLICATIONS

Synopsys, Inc, "S1AP/NAS Server test Suite Data Sheet", 8 pages, retrieved from Internet Aug. 14, 2019; https://www.synopsys.com.
3GPP, "3rd Generation Partnership Project; Technical Specification Group Radio Access Network; Evolved Universal Terrestrial Radio Access Network (E-UTRAN); S1 Application Protocol (S1AP) (Release 15)", 3GPP TS 36.413 715.6.0 (Jul. 2019), 388 pages.

(Continued)

*Primary Examiner* — Sudesh M Patidar
(74) *Attorney, Agent, or Firm* — Edell, Shapiro & Finnan, LLC (57) ABSTRACT

In one example embodiment, a server obtains a first indication of a first identifier associated with a user equipment in a wireless network, and first telemetry data associated with the first indication. The server obtains, from a network entity including a base station entity serving wireless communication in the wireless network, a second indication of the first identifier and second telemetry data associated with the second indication. The server determines that the first indication and the second indication match. In response to determining that the first indication and the second indication match, the server correlates the first telemetry data and the second telemetry data.

20 Claims, 7 Drawing Sheets

(56) References Cited

U.S. PATENT DOCUMENTS

| | | | | |
|---|---|---|---|---|
| 2012/0157088 | A1* | 6/2012 | Gerber | H04L 43/12 455/423 |
| 2013/0137451 | A1* | 5/2013 | Meredith | H04W 12/122 455/456.1 |
| 2014/0003333 | A1* | 1/2014 | Ivershen | H04W 24/08 370/328 |
| 2014/0155056 | A1* | 6/2014 | Jactat | H04W 16/18 455/422.1 |
| 2014/0323090 | A1* | 10/2014 | Keisala | H04W 8/18 455/411 |
| 2015/0078173 | A1* | 3/2015 | Javed | H04W 24/08 370/241 |
| 2015/0128056 | A1* | 5/2015 | Rizzi | H04L 43/045 715/736 |
| 2016/0036710 | A1* | 2/2016 | Hanaoka | H04L 47/11 370/235 |
| 2016/0142276 | A1* | 5/2016 | Shomura | H04L 67/14 709/224 |
| 2016/0142917 | A1* | 5/2016 | Calo | H04W 4/029 705/7.33 |
| 2016/0295398 | A1* | 10/2016 | Ketheesan | H04W 12/04 |
| 2016/0300160 | A1* | 10/2016 | Klein | G06Q 10/02 |
| 2017/0295178 | A1* | 10/2017 | Cheng | H04W 12/50 |
| 2019/0236870 | A1* | 8/2019 | Niles | H04W 4/029 |
| 2020/0120482 | A1* | 4/2020 | Parkvall | H04B 7/0452 |
| 2020/0120728 | A1* | 4/2020 | Wallentin | H04W 80/02 |
| 2020/0127907 | A1* | 4/2020 | Koo | H04L 43/06 |

OTHER PUBLICATIONS

3GPP, LTE; Evolved Universal Terrestrial Radio Access Network (E-UTRAN); Architecture description (3GPP TS 36.401 version 8.6.0 Release 8), ETSI TS 136 401 V8.6.0 (Jul. 2009), 21 pages.

Wikipedia, "International mobile subscriber identity", 4 pages, retrieved from from Internet Sep. 6, 2019; https://en.wikipedia.org/wiki/International_mobile_subscriber_identity.

Munawwar Sohul et al., "IMSI Exchange over the air for LTE Access Network", The Networking and Information Technology Research and Development (NITRD) Program, Sep. 13, 2018, 5 pages.

Karl Norrman et al., "Protecting IMSI and User Privacy in 5G Networks", Proceedings of the 9th EAI International Conference on Mobile Multimedia Communications. ICST (Institute for Computer Sciences, Social-Informatics and Telecommunications Engineering), 2016, 8 pages.

Wikipedia, "IMSI-catcher", 5 pages, retrieved from Internet Sep. 9, 2019; https://en.wikipedia.org/wiki/IMSI-catcher.

3GPP, 3rd Generation Partnership Project; Technical Specification Group Core Network and Terminals; Non-Access-Stratum (NAS) protocol for Evolved Packet System (EPS); Stage 3 (Release 10), 3GPP TS 24.301 V10.11.0 (Jun. 2013), 322 pages.

Netmanias, "EMM Procedure 1. Initial Attach—Part 2 Call Flow of Initial Attach", Jan. 16, 2014, 12 pages, retrieved from Internet Sep. 9, 2019; https://www.netmanias.com/en/?m=view&id=techdocs&no=10441.

* cited by examiner

| UE NAME | IMSI | eNB TELEMETRY DATA | MME TELEMETRY DATA | SGW TELEMETRY DATA |
|---|---|---|---|---|
| JOHN | 123450123456789 | MEDIAN CQI: 15 | MOBILITY STATE: CONNECTED | IN-BYTES (MBYTES): 215<br>OUT-BYTES (MBYTES): 10 |
| ALICE | 123451123456789 | MEDIAN CQI: 12 | MOBILITY STATE: IDLE | IN-BYTES (MBYTES): 115<br>OUT-BYTES (MBYTES): 20 |

TELEMETRY DATA CORRELATION FOR DEVICE-LEVEL ASSURANCE IN WIRELESS NETWORKS

TECHNICAL FIELD

The present disclosure relates to health assurance of wireless networks.

BACKGROUND

Telemetry data includes Key Performance Indicators and network events regarding one or more components of a telecommunications (wireless) network, such as wireless user devices (User Equipment) in the network. Telemetry data can be used to monitor various aspects of the network, address problems arising in the network, and otherwise provide insights into network health, latency, quality, etc. In some networks (e.g., fourth generation wireless networks) there can be multiple sources of telemetry data associated with a single user equipment.

DESCRIPTION OF EXAMPLE EMBODIMENTS

Overview

In one example embodiment, a server obtains a first indication of a first identifier associated with a user equipment in a wireless network, and first telemetry data associated with the first indication. The server obtains, from a network entity including a base station entity serving wireless communication in the wireless network, a second indication of the first identifier and second telemetry data associated with the second indication. The server determines that the first indication and the second indication match. In response to determining that the first indication and the second indication match, the server correlates the first telemetry data and the second telemetry data.

Example Embodiments

Figure 1:
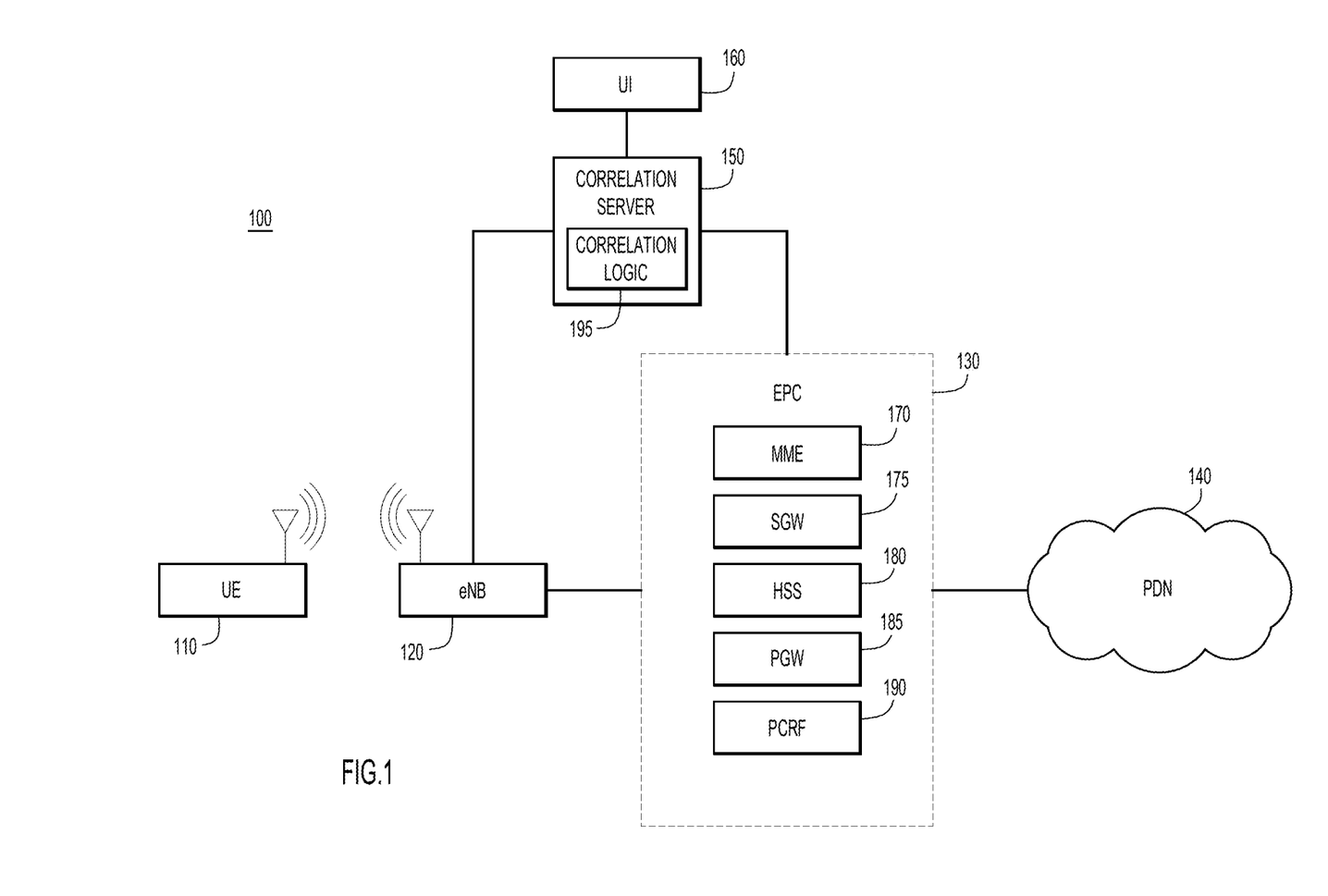
FIG. 1 illustrates a system configured for correlation of telemetry data obtained from multiple wireless network entities including at least one base station entity, according to an example embodiment.

FIG. 1 illustrates an example system 100 configured for correlation of telemetry data in a wireless network. System 100 includes UE 110, eNodeB (eNB) 120, Evolved Packet Core (EPC) 130, Packet Data Network (PDN) 140, correlation server 150, and User Interface (UI) 160. EPC 130 includes Mobility Management Entity (MME) 170, Serving Gateway (SGW) 175, Home Subscriber Server (HSS) 180, PDN Gateway (PGW) 185, and Policy and Charging Rules Function (PCRF) 190. eNB 120 and EPC 130 may be part of a private fourth-generation wireless network. It will be appreciated that the techniques described herein may be implemented in any wireless network now known or hereinafter developed, such as a fifth-generation wireless network. For example, these techniques may be compatible with an eNB or any other network entity that includes a base station entity (performs functions of a base station) that serves wireless communication in a wireless network. Furthermore, these techniques may apply to any public or private wireless network.

UE 110 may be a laptop, mobile phone, or any other wireless user device. eNB 120 may provide/serve wireless communication in the wireless network (e.g., between UE 110 and EPC 130). EPC 130 may facilitate communication between eNB 120 and PDN 140 (e.g., the Internet). Correlation server 150 may be configured to obtain telemetry data regarding UE 110 from eNB 120 and EPC 130. UI 160 may include any suitable device (e.g., display, keyboard, mouse, etc.) to enable interactions between correlation server 150 and a user (e.g., a network administrator). MME 170 may be responsible for controlling many aspects of access to EPC 130 by UE 110, such as bearer activation/deactivation, user authentication, and idle mode paging and tagging. SGW 175 may route/forward wireless communication. HSS 180 may maintain user- or subscription-related information. PGW 185 may provide network connectivity to PDN 140. PCRF 190 may support charging based on data packet flow.

Correlation server 150 may be configured to obtain any suitable type of telemetry data regarding UE 110 from eNB 120 and EPC 130. For example, eNB 120 may provide telemetry data including Channel Quality Indicator (CQI), Rank Indicator (RI), client mobility events, etc. MME 170 may provide telemetry data including an indication of the eNB to which UE 110 is connected (here, eNB 120), Evolved Packet System (EPS) Mobility Management (EMM) state, etc. SGW 175 and/or PGW 185 may provide telemetry data including Internet Protocol (IP) address, IP statistics, Network Based Application Recognition (NBAR) data, application visibility information, etc.

Conventionally, eNB 120 and EPC 130 would use different identifiers to identify UE 110, and as such correlation server 150 would be unable to correlate the telemetry data obtained from eNB 120 and the telemetry data obtained from EPC 130. For example, eNB 120 would use a Cell Radio Network Temporary Identifier (C-RNTI) to identify UE 110 whereas components of EPC 130 would use the International Mobile Subscriber Identity (IMSI). Because the C-RNTI and IMSI are different identifiers, correlation server 150 would not know they represent the same UE 110. The C-RNTI is a dynamic 16-bit number assigned to UE 110 by the serving eNB (here, eNB 120) and is reassigned whenever UE 110 moves to another eNB. The IMSI is a static 64-bit number that is provided by UE 110 to the wireless network. Correlation server 150 would treat the telemetry data obtained from eNB 120 and the telemetry data obtained from EPC 130 as belonging to separate network entities even though both sets of telemetry data correspond to UE 110. This could lead to missed observations regarding the wireless network and ongoing failure to correct problems associated with UE 110.

Figure 2:
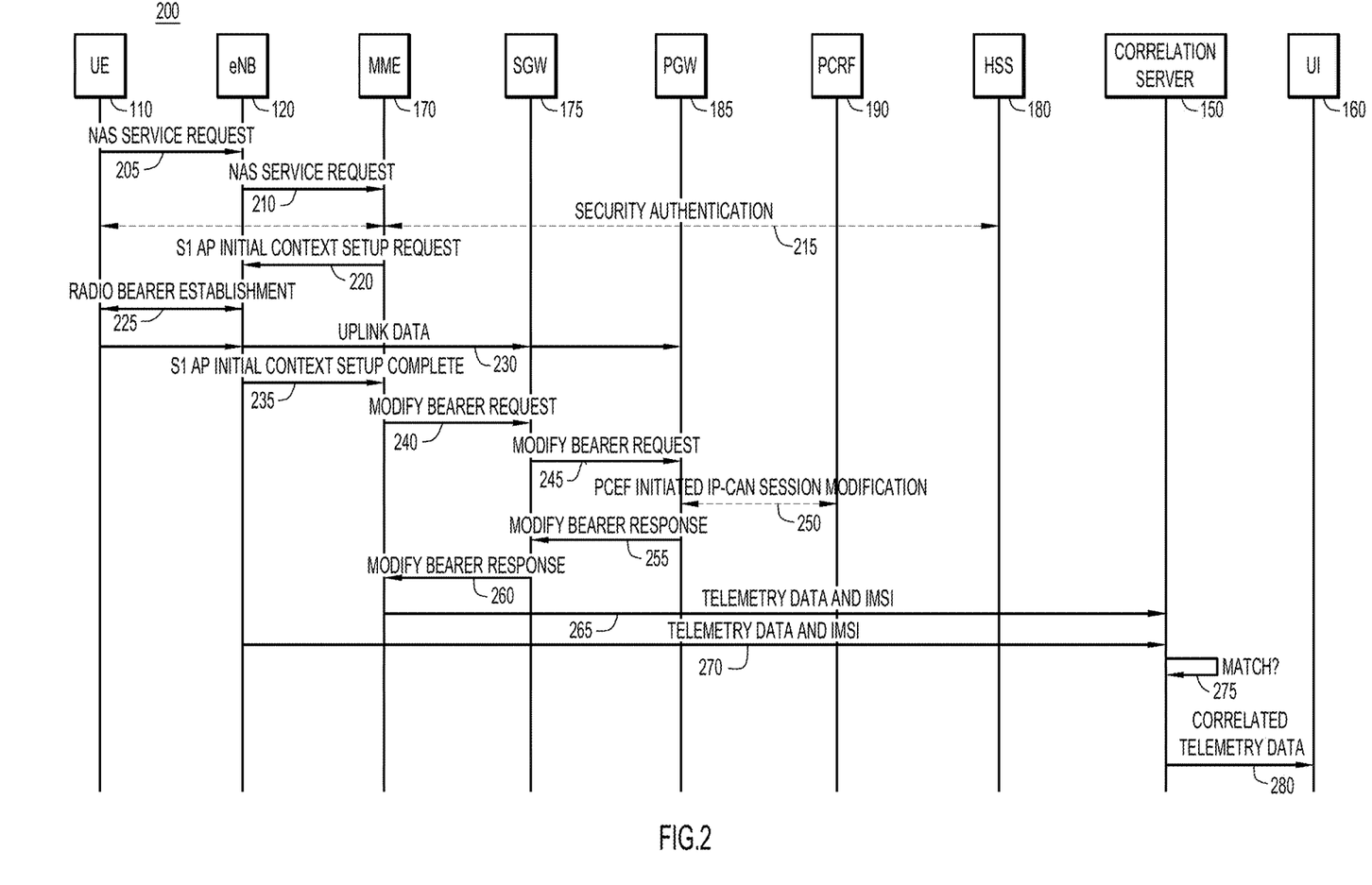
FIG. 2 illustrates a sequence diagram of a method for correlation of telemetry data based on an International Mobile Subscriber Identity (IMSI), according to an example embodiment.
Figure 3:
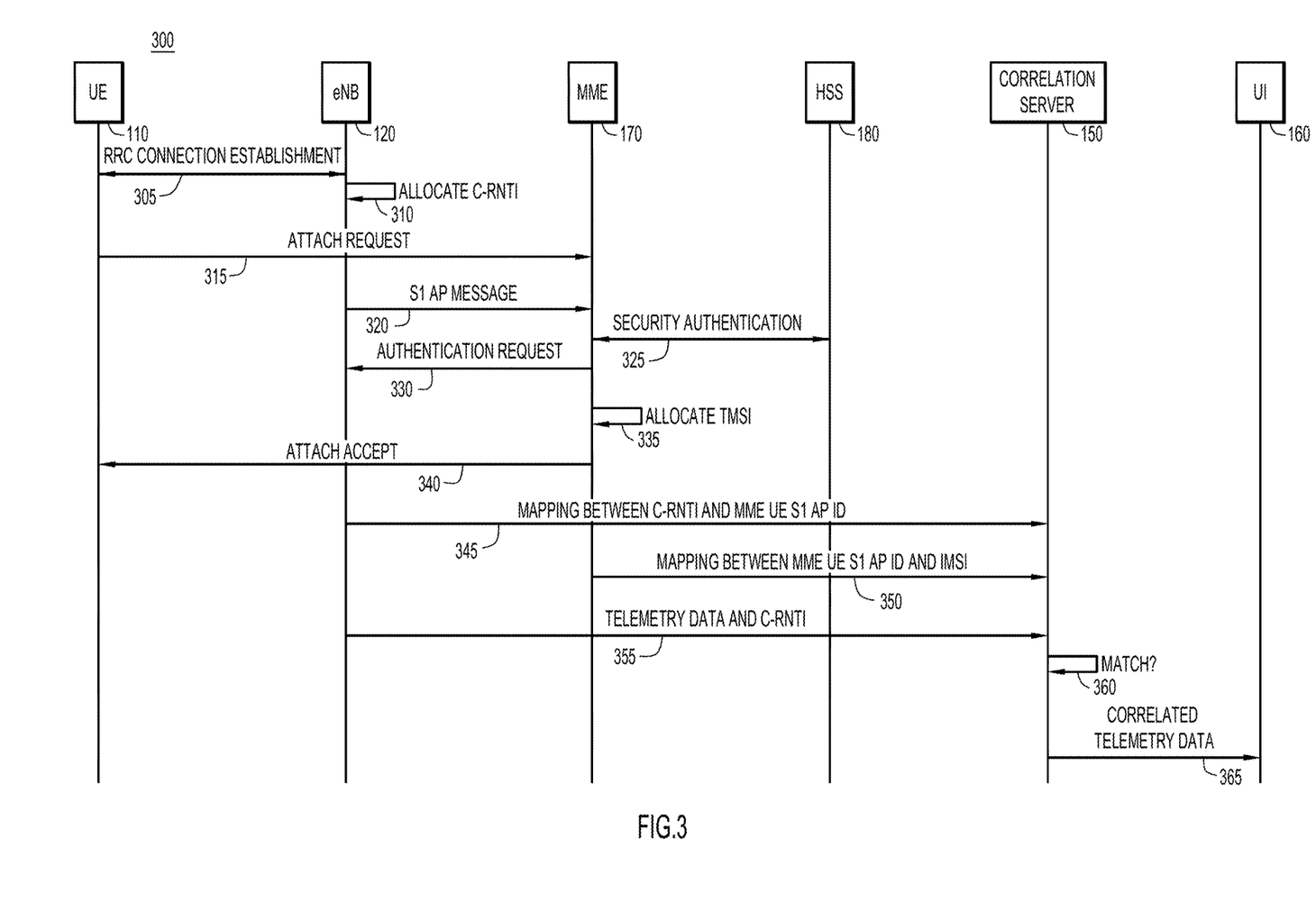
FIG. 3 illustrates a sequence diagram of a method for correlation of telemetry data based on an IMSI, a Mobility Management Entity (MME) User Equipment (UE) S1 Application Protocol (AP) Identity (ID), and a Cell Radio Network Temporary Identifier (C-RNTI), according to an example embodiment.
Figure 4:
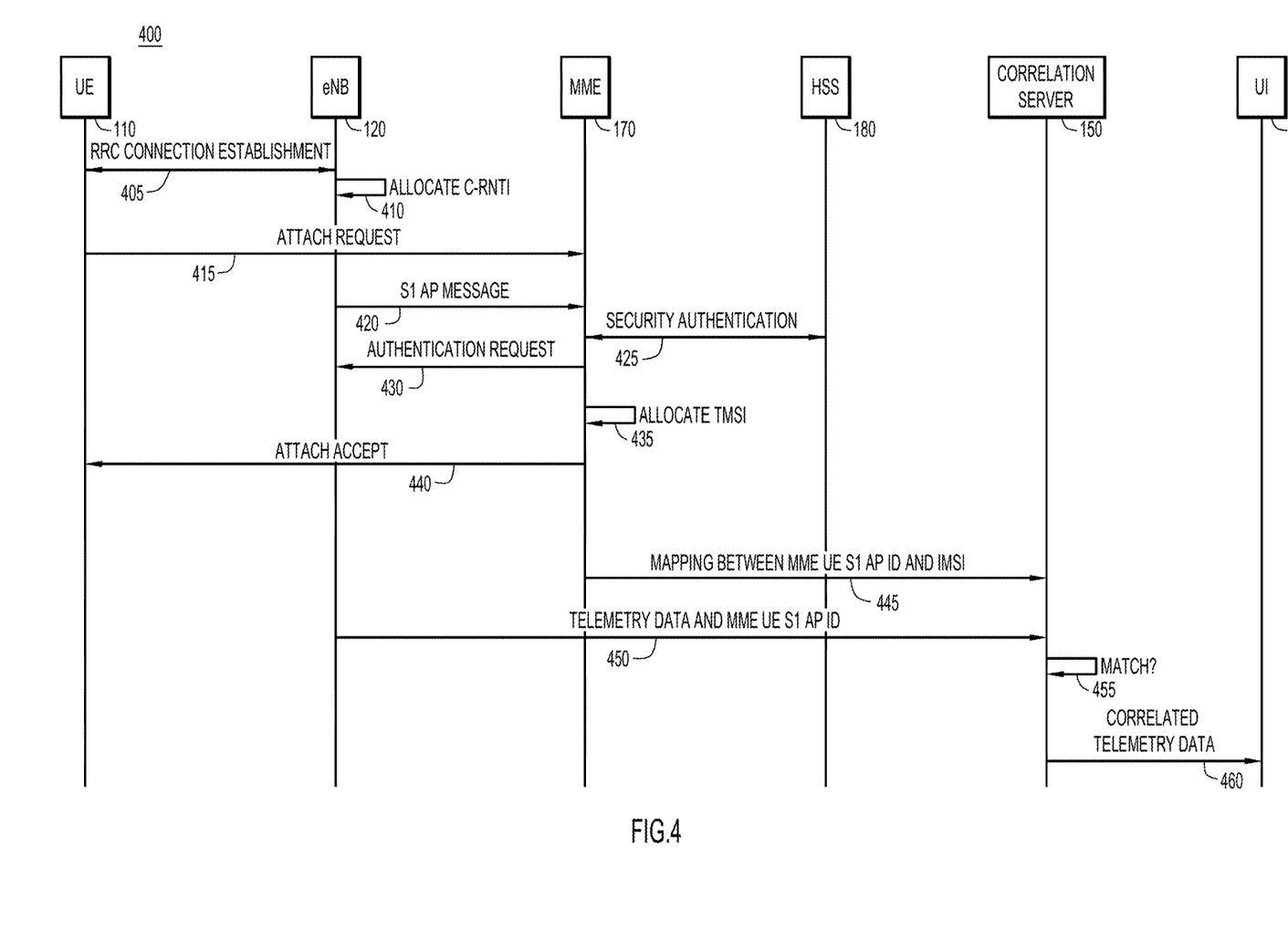
FIG. 4 illustrates a sequence diagram of a method for correlation of telemetry data based on an IMSI and a MME UE S1 AP ID, according to an example embodiment.

Accordingly, correlation logic 195 is provided to enable correlation server 150 to correlate telemetry data obtained from eNB 120 and telemetry data obtained from EPC 130. In one example, correlation server 150 may obtain a first indication of a first identifier associated with UE 110, and first telemetry data associated with the first indication. Correlation sever 150 may further obtain, from eNB 120, a second indication of the first identifier and second telemetry data associated with the second indication. Correlation sever 150 may determine that the first indication and the second indication match and, in response, correlate the first telemetry data and the second telemetry data. FIGS. 2-4 each demonstrate an example method for implementing these techniques.

With continuing reference to FIG. 1, FIG. 2 illustrates a sequence diagram of a method 200 for correlation of telemetry data. At 205, UE 110 provides a Non-Access Stratum (NAS) service request to eNB 120. The NAS service request may include the IMSI or a MME Temporary Mobile Subscriber Identifier (M-TMSI) of UE 110. eNB 120 should not be able to sniff the IMSI, but even if eNB 120 can sniff the IMSI, eNB 120 cannot discover the M-TMSI. As a result, eNB 120 may rely on MME 170 to provide the IMSI at a later point in time. At 210, eNB 120 may provide the NAS service request to MME 170, which may obtain the IMSI from the NAS service request. At 215, MME 170 may initiate a security authentication procedure with HSS 180 to authenticate UE 110. In this example, UE 110 is successfully authenticated.

At 220, MME 170 may provide an S1 Application Protocol (AP) initial context setup request to eNB 120. The S1 AP initial context setup request may be enhanced to include the IMSI. In particular, an IMSI Information Element (IE) may be added to the S1 AP initial context setup request to provide eNB 120 with the IMSI. Because this example involves a private wireless network, any IMSI privacy concerns may be minimal and extensions to the S1 interface more readily implemented. At 225, radio bearer establishment may occur between UE 110 and eNB 120. At 230, UE 110 provides uplink data to PDN 140 via eNB 120, SGW 175, and PGW 185. At 235, eNB 120 provides an indication to MME 170 that the S1 AP initial context setup is complete. At 240, MME 170 provides a modify bearer request to SGW 175. At 245, SGW 175 provides the modify bearer request to PGW 185. At 250, PGW 185 and PCRF 190 perform a Policy and Charging Enforcement Function (PCEF) initiated IP Connectivity Access Network (IP-CAN) session modification. At 255, PGW 185 provides a modify bearer response 255 to SGW 175.

At 260, SGW 175 provides the modify bearer response to MME 170. At 265, correlation server 150 obtains, from MME 170, a first copy of the IMSI and telemetry data associated with the IMSI. At 270, correlation server 150 obtains, from eNB 120, a second copy of the IMSI and telemetry data associated with the IMSI. In certain examples, eNB 120 may also provide the C-RNTI of UE 110. At 275, correlation server 150 determines whether the first copy of the IMSI and the second copy of the IMSI are equivalent/identical. In this example, the copies are equivalent, and as such correlation server 150 determines that the telemetry data obtained from MME 170 and the telemetry data obtained from eNB 120 are both associated with UE 110. In a further example, correlation server 150 may obtain, from SGW 175 and/or PGW 185, a third copy of the IMSI and telemetry data associated with the IMSI and correlate the telemetry data obtained from SGW 175 and/or PGW 185 with the telemetry data obtained from MME 170 and the telemetry data obtained from eNB 120. At 280, correlation server 150 provides the correlated telemetry data, identified by the IMSI, to UI 160 for display to a user. Thus, correlation server 150 displays a correlation of the telemetry data obtained from MME 170 and the telemetry data obtained from eNB 120.

With continuing reference to FIG. 1, FIG. 3 illustrates a sequence diagram of a method 300 for correlation of telemetry data. At 305, UE 110 and eNB 120 establish a Radio Resource Control (RRC) connection. At 310, eNB 120 allocates a C-RNTI for UE 110. At 315, UE 110 sends an attach request to MME 170 via eNB 120. The attach request may be IMSI-based (e.g., may include the IMSI of UE 110). At 320, eNB 120 may provide, to MME 170, an S1 AP message carrying an attach request that includes an eNB UE S1 AP ID. The eNB UE S1 AP ID may be an ID associated with (assigned to) UE 110 by eNB 120. At 325, MME 170 may initiate a security authentication procedure with HSS 180 to authenticate UE 110. In this example, UE 110 is successfully authenticated. At 330, MME 170 may provide, to eNB 120, an authentication request including an MME UE S1 AP ID. MME UE S1 AP ID may be an ID associated with UE 110 by MME 170. Thus, each of eNB 120 and MME 170 have access to both the eNB UE S1 AP ID and the MME UE S1 AP ID.

At 335, MME 170 generates an M-TMSI corresponding to the IMSI and allocates the M-TMSI to UE 110. At 340, MME 170 provides, to UE 110, an attach accept that includes the M-TMSI. Thus, only MME 170 and the UE 110 are aware of the M-TMSI. At 345, correlation server 150 obtains, from eNB 120, a first mapping between the C-RNTI and a first copy of the MME UE S1 AP ID. At 350, correlation server 150 obtains, from MME 170, a second mapping between a second copy of the MME UE S1 AP ID and the IMSI. Correlation server 150 may also obtain telemetry data from MME 170 that is associated with the MME UE S1 AP ID and/or IMSI concurrently with or separately from (e.g., before or after) the first mapping. MME 170 may use the IMSI even when UE 110 uses the M-TMSI to attach. At 355, correlation server 150 obtains telemetry data from eNB 120 that is associated with the C-RNTI. It will be appreciated that correlation server 150 may alternatively obtain the telemetry data from eNB 120 concurrently with the second mapping.

At 360, correlation server 150 may determine whether the first copy of the MME UE S1 AP ID and the second copy of the MME UE S1 AP ID are equivalent. In this example, the copies are equivalent, and as such correlation server 150 maps the C-RNTI to the IMSI and determines that the telemetry data obtained from MME 170 and the telemetry data obtained from eNB 120 are both associated with UE 110. Using MME UE S1 AP ID may enable correlation server 150 to track telemetry data for UE 110 consistently because the C-RNTI changes during handover/reattachment but MME UE S1 AP ID does not. At 365, correlation server 150 provides the correlated telemetry data, identified by the IMSI, to UI 160 for display to a user. Thus, correlation server 150 displays a correlation of the telemetry data obtained from MME 170 and the telemetry data obtained from eNB 120.

With continuing reference to FIG. 1, FIG. 4 illustrates a sequence diagram of a method 400 for correlation of telemetry data. At 405, UE 110 and eNB 120 establish a RRC connection. At 410, eNB 120 allocates a C-RNTI for UE 110. At 415, UE 110 sends an attach request to MME 170 via eNB 120. The attach request may be IMSI-based. At 420, eNB 120 may provide, to MME 170, an S1 AP message carrying an attach request that includes an eNB UE S1 AP ID. The eNB UE S1 AP ID may be an ID associated with UE 110 by eNB 120. At 425, MME 170 may initiate a security authentication procedure with HSS 180 to authenticate UE 110. In this example, UE 110 is successfully authenticated. At 430, MME 170 may provide, to eNB 120, an authentication request including an MME UE S1 AP ID. MME UE S1 AP ID may be an ID associated with UE 110 by MME 170. Thus, each of eNB 120 and MME 170 know both the eNB UE S1 AP ID and the MME UE S1 AP ID.

At 435, MME 170 allocates a TMSI corresponding to the IMSI to UE 110. At 440, MME 170 provides, to UE 110, an attach accept that includes the TMSI. At 445, correlation server 150 obtains, from MME 170, a mapping between the IMSI and a first copy of the MME UE S1 AP ID. Correlation server 150 may obtain telemetry data from MME 170 that is associated with the IMSI and/or the MME UE S1 AP ID concurrently or separately from the mapping. At 450, correlation server 150 obtains a second copy of the MME UE S1 AP ID and telemetry data from eNB 120 that is associated with the MME UE S1 AP ID.

At 455, correlation server 150 may determine whether the first copy of the MME UE S1 AP ID and the second copy of the MME UE S1 AP ID are equivalent. In this example, the copies are equivalent, and as such correlation server 150 determines that the telemetry data obtained from MME 170 and the telemetry data obtained from eNB 120 are both associated with UE 110. At 460, correlation server 150 provides the correlated telemetry data, identified by the IMSI, to UI 160 for display to a user. Thus, correlation server 150 displays a correlation of the telemetry data obtained from MME 170 and the telemetry data obtained from eNB 120.

Figure 5:
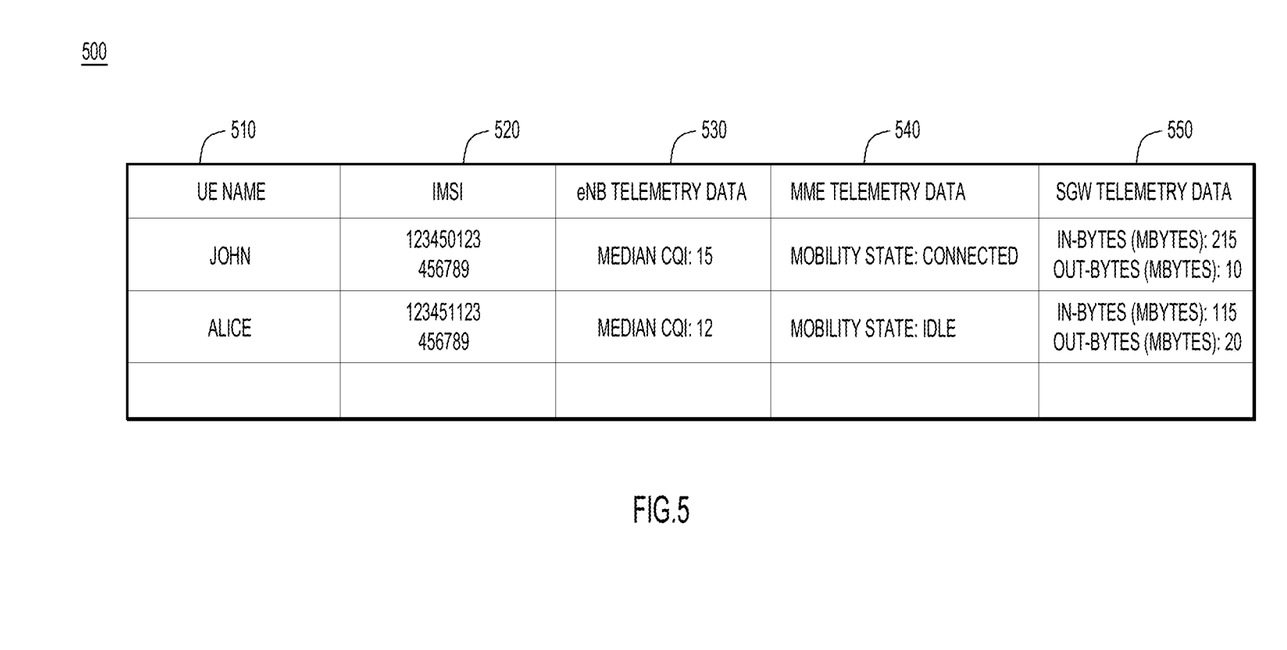
FIG. 5 illustrates an example display of correlated telemetry data on a user interface, according to an example embodiment.

With continued reference to FIG. 1, FIG. 5 illustrates an example display 500 of correlated telemetry data on UI 160. Display 500 includes a field 510 for a user-identifiable name of UE 110 (e.g., "John"), a field 520 for the IMSI of UE 110 (e.g., "123450123456789"), a field 530 for telemetry data regarding UE 110 obtained from eNB 120 (e.g., "Median CQI: 15"), a field 540 for telemetry data regarding UE 110 obtained from MME 170 (e.g., "Mobility State: Connected"), and a field 550 for telemetry data regarding UE 110 obtained from SGW 175 and/or PGW 185 (e.g., "In-Bytes (Mbytes): 215; Out-Bytes(Mbytes): 10"). Display 500 also includes correlated telemetry data for a second UE (user-identifiable name "Alice").

In one example, correlation server 150 may obtain, from HSS 180, a mapping between the IMSI of UE 110 and the user-identifiable name of UE 110. The user-identifiable name may be a name of the user associated UE 110 (e.g., "John") or an indication of some other property of the device, such as its intended function (e.g., "video-camera-1"). Based on the mapping, correlation server 150 may correlate the user-identifiable name of UE 110 with the telemetry data obtained from eNB 120, MME 170, SGW 175, and/or PGW 185. Correlation server 150 may thereby display (via UI 160) a correlation of the user-identifiable name of UE 110 and the telemetry data obtained from eNB 120, MME 170, SGW 175, and/or PGW 185. It will be appreciated that HSS 180 may also provide other information such as corporate user ID of UE 110, device type of UE 110, etc. This other information may also be displayed via UI 160.

More sophisticated displays are also possible. For example, correlation server 150 may combine events and statistics obtained from eNB 120, MME 170, SGW 175, and/or PGW 185 to create a comprehensive client dashboard. The dashboard may provide a history of client onboarding and mobility events as well as a consolidated client view illustrating Radio Frequency (RF) data (e.g., CQI), IP data (e.g., packets in/out), and/or applications data (e.g., voice, video, etc.). Thus, correlation server 150 may correlate and collate device-level (UE-specific) telemetry records from different entities such as eNB 120, MME 170, SGW 175, and/or PGW 185 to generate a single record that includes many diverse fields.

Correlation server 150 may also perform one or more actions based on the correlated telemetry data in addition/alternative to displaying the correlated telemetry data. These actions may involve network analysis and/or remediation based on the correlated telemetry data. For instance, correlation server 150 may perform automatic root-cause analysis based on the correlated telemetry sources. In one example, the statistics from a first server may indicate low throughput and statistics from a second server may indicate poor RF quality. Correlation server 150 may correlate data from the first server and data from the second server to determine that the poor RF quality of the second server is a root cause for the low throughput of the first server.

Figure 6:
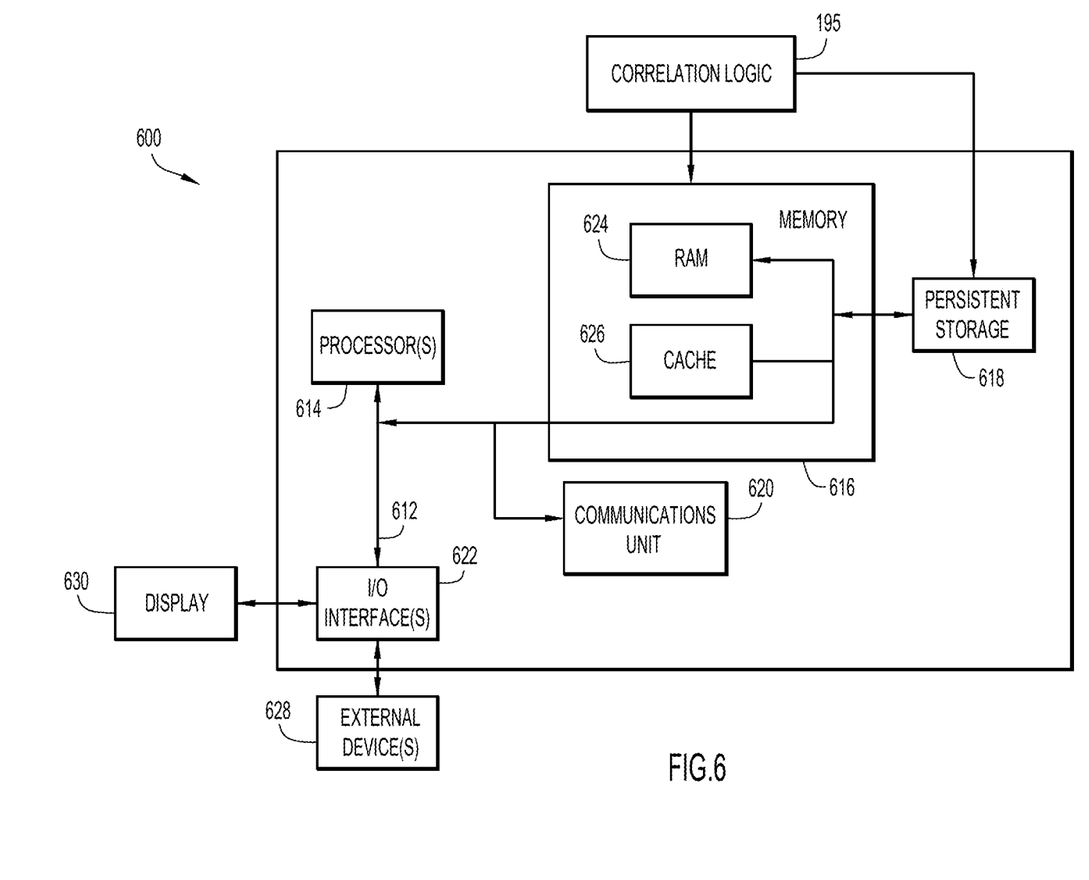
FIG. 6 illustrates a block diagram of a computing device configured to correlate telemetry data obtained from multiple network entities including at least one base station entity, according to an example embodiment.

FIG. 6 illustrates a hardware block diagram of an example device 600 (e.g., computing device, such as correlation server 150). It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and Input/Output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes Random Access Memory (RAM) 624 and cache memory 626. In general, memory 616 can include any suitable volatile or non-volatile computer readable storage media. Instructions for correlation logic 195 may be stored in memory 616 or persistent storage 618 for execution by computer processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to device 600. For example, I/O interface(s) 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

Figure 7:
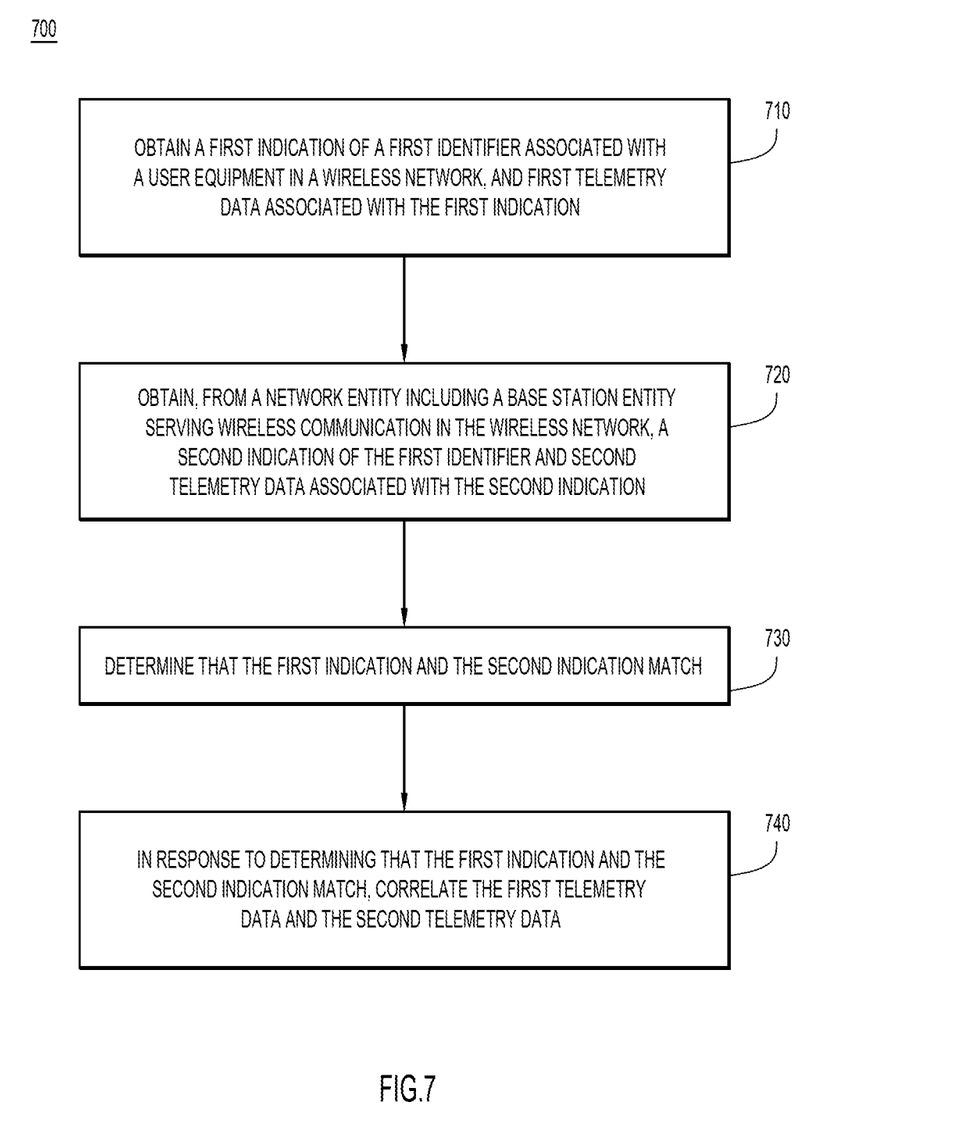
FIG. 7 illustrates a flowchart of a method for correlating telemetry data obtained from multiple network entities including at least one base station entity, according to an example embodiment.

FIG. 7 is a flowchart of an example method 700 for correlating telemetry data. In one example, method 700 may be performed by one or more servers (e.g., correlation server 150). At 710, correlation server 150 obtains a first indication of a first identifier associated with a user equipment in a wireless network, and first telemetry data associated with the first indication. At 720, correlation server 150 obtains, from a network entity including a base station entity serving wireless communication in the wireless network, a second indication of the first identifier and second telemetry data associated with the second indication. At 730, correlation server 150 determines that the first indication and the second indication match. At 740, in response to determining that the first indication and the second indication match, correlation server 150 correlates the first telemetry data and the second telemetry data.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining a first indication of a first identifier associated with a user equipment in a wireless network, and first telemetry data associated with the first indication; obtaining, from a network entity including a base station entity serving wireless communication in the wireless network, a second indication of the first identifier and second telemetry data associated with the second indication; determining that the first indication and the second indication match; and in response to determining that the first indication and the second indication match, correlating the first telemetry data and the second telemetry data.

In one example, obtaining the first indication includes obtaining a first copy of the first identifier, wherein the first telemetry data is associated with the first identifier; obtaining the second indication includes obtaining a second copy of the first identifier, wherein the second telemetry data is associated with the first identifier, and wherein the network entity obtained a previous indication of the first identifier from another network entity; and determining that the first indication and the second indication match includes determining that the first copy and the second copy are equivalent.

In one example, obtaining the first indication includes obtaining a first mapping between the first identifier and a first copy of a second identifier that another network entity associates with the user equipment, wherein the first telemetry data is associated with the first identifier or the second identifier; obtaining the second indication includes obtaining a second mapping between a second copy of the second identifier and a third identifier that the network entity associates with the user equipment, wherein the second telemetry data is associated with the third identifier; and determining that the first indication and the second indication match includes determining that the first copy and the second copy are equivalent.

In one example, obtaining the first indication includes obtaining a mapping between the first identifier and a first copy of a second identifier that another network entity associates with the user equipment, wherein the first telemetry data is associated with the first identifier or the second identifier; obtaining the second indication includes obtaining a second copy of the second identifier, wherein the second telemetry data is associated with the second identifier; and determining that the first indication and the second indication match includes determining that the first copy and the second copy are equivalent.

In one example, the method further comprises: displaying a correlation of the first telemetry data and the second telemetry data. In a further example, the method further comprises: obtaining a mapping between the first identifier and a user-identifiable name of the user equipment; and based on the mapping, correlating the user-identifiable name with the first telemetry data and the second telemetry data, wherein displaying the correlation of the first telemetry data and the second telemetry data includes displaying a correlation of the first telemetry data, the second telemetry data, and the user-identifiable name.

In one example, the method further comprises: performing analysis or remediation on behalf of the wireless network based on a correlation of the first telemetry data and the second telemetry data.

In another form, an apparatus is provided. The apparatus comprises: a network interface configured to obtain or provide network communications; and one or more processors coupled to the network interface, wherein the one or more processors are configured to: obtain a first indication of a first identifier associated with a user equipment in a wireless network, and first telemetry data associated with the first indication; obtain, from a network entity including a base station entity serving wireless communication in the wireless network, a second indication of the first identifier and second telemetry data associated with the second indication; determine that the first indication and the second indication match; and in response to determining that the first indication and the second indication match, correlate the first telemetry data and the second telemetry data.

In another form, one or more non-transitory computer readable storage media are provided. The non-transitory computer readable storage media are encoded with instructions that, when executed by a processor, cause the processor to: obtain a first indication of a first identifier associated with a user equipment in a wireless network, and first telemetry data associated with the first indication; obtain, from a network entity including a base station entity serving wireless communication in the wireless network, a second indication of the first identifier and second telemetry data associated with the second indication; determine that the first indication and the second indication match; and in response to determining that the first indication and the second indication match, correlate the first telemetry data and the second telemetry data.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining, from a mobility management entity, an international mobile subscriber identity (IMSI) associated with a user equipment in a wireless network, and first telemetry data associated with the IMSI, wherein the first telemetry data includes an indication of an evolved packet system mobility management state;
obtaining a mapping between the IMSI and a user-identifiable name of the user equipment;

obtaining, from the mobility management entity, first data indicating a first association between the IMSI and a user equipment S1 access point identifier;

obtaining, from a network entity including a base station entity serving wireless communication in the wireless network, second telemetry data associated with the user equipment S1 access point identifier;

determining, based on the first association, that the IMSI and the user equipment S1 access point identifier identify the same user equipment;

in response to the determining, correlating the first telemetry data obtained from the mobility management entity and the second telemetry data;

based on the mapping, correlating the user-identifiable name with the first telemetry data obtained from the mobility management entity and the second telemetry data to produce a correlation of the first telemetry data obtained from the mobility management entity, the second telemetry data, and the user-identifiable name; and performing analysis or remediation on behalf of the wireless network based on the correlating of the first telemetry data obtained from the mobility management entity and the second telemetry data.

2. The method of claim 1, further comprising:
displaying the correlation of the first telemetry data obtained from the mobility management entity, the second telemetry data, and the user-identifiable name.

3. The method of claim 1, further comprising:
providing data derived from the correlating of the first telemetry data obtained from the mobility management entity and the second telemetry data to a user interface.

4. The method of claim 1, wherein obtaining the mapping includes:
obtaining the mapping from a home subscriber server (HSS).

5. The method of claim 1, wherein obtaining the first data indicating the first association between the IMSI and the user equipment S1 access point identifier includes:
obtaining the first data indicating the first association between the IMSI and a mobility management entity user equipment S1 access point identifier.

6. The method of claim 1, wherein obtaining the second telemetry data from the network entity including the base station entity serving wireless communication in the wireless network includes:
obtaining the second telemetry data from an eNodeB.

7. The method of claim 1, wherein obtaining the first telemetry data from the mobility management entity further includes:
obtaining an indication of the network entity including the base station entity serving wireless communication in the wireless network.

8. The method of claim 1, wherein obtaining the second telemetry data from the base station entity serving wireless communication in the wireless network includes:
obtaining one or more of a channel quality indicator or a rank indicator.

9. The method of claim 1, wherein obtaining the second telemetry data from the base station entity serving wireless communication in the wireless network includes:
obtaining client mobility events.

10. An apparatus comprising: a network interface configured to obtain or provide network communications; and
one or more processors coupled to the network interface, wherein the one or more processors are configured to:

obtain, from a mobility management entity, an international mobile subscriber identity (IMSI) associated with a user equipment in a wireless network, and first telemetry data associated with the IMSI, wherein the first telemetry data includes an indication of an evolved packet system mobility management state;

obtain a mapping between the IMSI and a user-identifiable name of the user equipment;

obtain, from the mobility management entity, first data indicating a first association between the IMSI and a user equipment S1 access point identifier;

obtain, from a network entity including a base station entity serving wireless communication in the wireless network, second telemetry data associated with the user equipment S1 access point identifier;

determine, based on the first association, that the IMSI and the user equipment S1 access point identifier identify the same user equipment;

in response to determining that the IMSI and the user equipment S1 access point identifier identify the same user equipment, correlate the first telemetry data obtained from the mobility management entity and the second telemetry data to produce a correlation of the first telemetry data obtained from the mobility management entity and the second telemetry data;

based on the mapping, correlate the user-identifiable name with the first telemetry data obtained from the mobility management entity and the second telemetry data to produce a correlation of the first telemetry data obtained from the mobility management entity, the second telemetry data, and the user-identifiable name; and perform analysis or remediation on behalf of the wireless network based on the correlation of the first telemetry data obtained from the mobility management entity and the second telemetry data.

11. The apparatus of claim 10, wherein the one or more processors are further configured to:
display the correlation of the first telemetry data obtained from the mobility management entity, the second telemetry data, and the user-identifiable name.

12. The apparatus of claim 10, wherein the one or more processors are further configured to:
provide data derived from the correlation of the first telemetry data obtained from the mobility management entity and the second telemetry data to a user interface.

13. The apparatus of claim 10, wherein the one or more processors are configured to:
obtain the mapping from a home subscriber server (HSS).

14. The apparatus of claim 10, wherein the one or more processors are configured to:
obtain the first data indicating the first association between the IMSI and a mobility management entity user equipment S1 access point identifier.

15. The apparatus of claim 10, wherein the one or more processors are configured to:
obtain the second telemetry data from an eNodeB.

16. One or more non-transitory computer readable storage media encoded with instructions that, when executed by a processor, cause the processor to:
obtain, from a mobility management entity, an international mobile subscriber identity (IMSI) associated with a user equipment in a wireless network, and first telemetry data associated with the IMSI, wherein the first telemetry data includes an indication of an evolved packet system mobility management state;

obtain a mapping between the IMSI and a user-identifiable name of the user equipment;
obtain, from the mobility management entity, first data indicating a first association between the IMSI and a user equipment S1 access point identifier;
obtain, from a network entity including a base station entity serving wireless communication in the wireless network, second telemetry data associated with the user equipment S1 access point identifier;
determine, based on the first association, that the IMSI and the user equipment S1 access point identifier identify the same user equipment;
in response to determining that the IMSI and the user equipment S1 access point identifier identify the same user equipment, correlate the first telemetry data obtained from the mobility management entity and the second telemetry data to produce a correlation of the first telemetry data obtained from the mobility management entity and the second telemetry data;
based on the mapping, correlate the user-identifiable name with the first telemetry data obtained from the mobility management entity and the second telemetry data to produce a correlation of the first telemetry data obtained from the mobility management entity, the second telemetry data, and the user-identifiable name; and perform analysis or remediation on behalf of the wireless network based on the correlation of the first telemetry data obtained from the mobility management entity and the second telemetry data.

17. The one or more non-transitory computer readable storage media of claim 16, wherein the instructions, when executed by the processor, cause the processor to:
display the correlation of the first telemetry data obtained from the mobility management entity, the second telemetry data, and the user-identifiable name.

18. The one or more non-transitory computer readable storage media of claim 16, wherein the instructions, when executed by the processor, cause the processor to:
provide data derived from the correlation of the first telemetry data obtained from the mobility management entity and the second telemetry data to a user interface.

19. The one or more non-transitory computer readable storage media of claim 16, wherein the instructions, when executed by the processor, cause the processor to:
obtain the first data indicating the first association between the IMSI and a mobility management entity user equipment S1 access point identifier.

20. The one or more non-transitory computer readable storage media of claim 16, wherein the instructions, when executed by the processor, cause the processor to:
obtain the second telemetry data from an eNodeB.

* * * * *